Aug. 23, 1960     A. NAWIJN     2,949,830
PHOTOGRAPHIC CAMERA
Filed Jan. 13, 1958
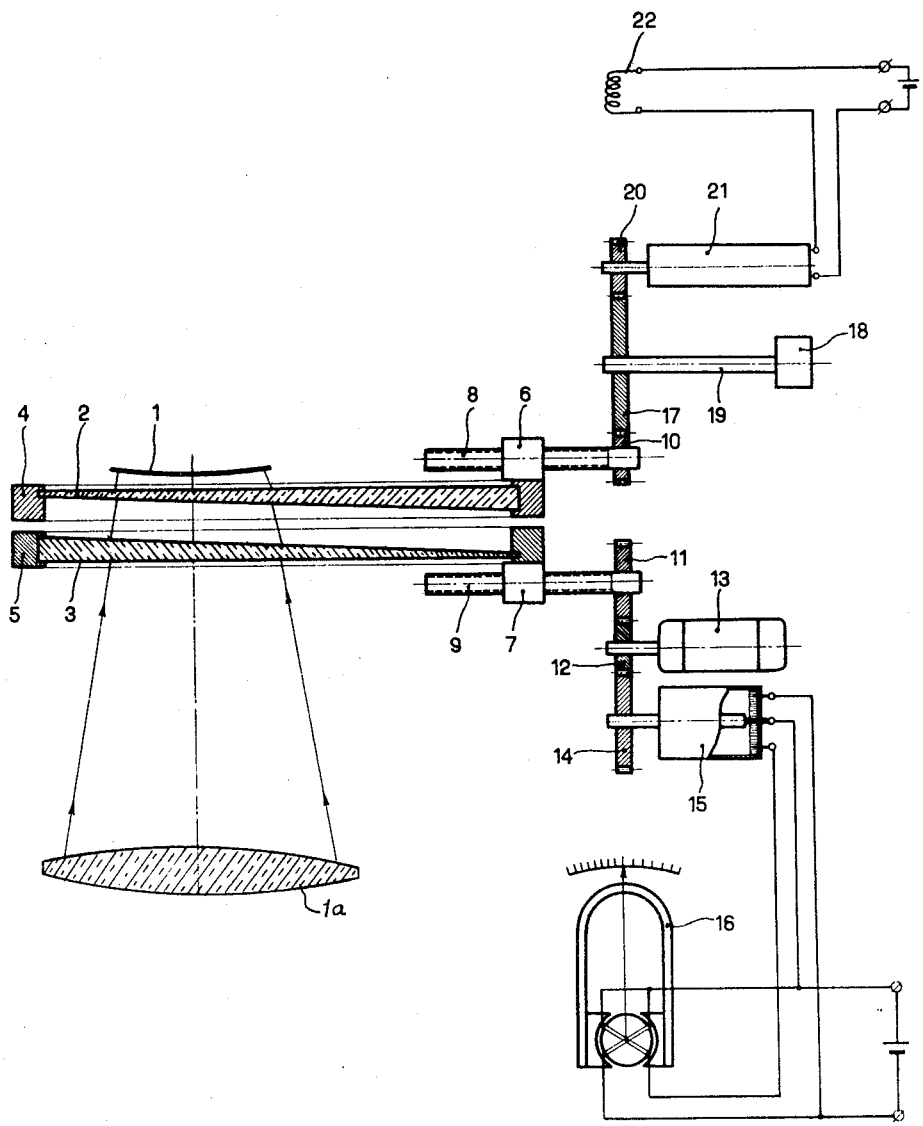
INVENTOR:
Arjen NAWIJN
BY
Wenderoth, Lind & Ponack
Attys

United States Patent Office 2,949,830
Patented Aug. 23, 1960

2,949,830
PHOTOGRAPHIC CAMERA

Arjen Nawijn, Delft, Netherlands, assignor to N.V. Optische Industrie "De Oude Delft," Delft, Netherlands Filed Jan. 13, 1958, Ser. No. 708,690

Claims priority, application Netherlands Jan. 15, 1957

3 Claims. (Cl. 95—12.5)

The invention relates to a camera, particularly for aerial photography, of the type in which a prismatic wedge is provided for the purpose of focussing, said prismatic wedge being slidably mounted substantially parallel to the focal plane and a short distance in front of the focal plane. By shifting the wedge it is possible to introduce a variable thickness of glass dependent of the object distance in the path of the light rays, thus shortening or lengthening the optical path in such a manner that the image formed on the film is always sharply defined. Both the position of the film and that of the optical elements of the camera objective remain fixed, which is a great advantage in cameras of high precision such as aerial cameras.

When cameras are exposed to variations in temperature, camera adjustment and other conditions being constant, the effect produced is, in principle, that the image is displaced and the camera comes out of focus. As a rule this has no adverse consequences, but in cameras that are required to have a high resolving power this change of position of the image involves a serious restriction of the resolving power. This defocussing effect is mainly due to expansion and contraction phenomena in the glass of which the optical elements are made, giving rise to variations of the radii of curvature of the optically effective surfaces. The simultaneous occurrence of expansion or contraction of the camera housing also has a certain effect which, though in some cases of a compensatory nature, of course generally will not have the same magnitude and the same time constant as the expansion and contraction phenomena in the glass. For these reasons efforts have been made to keep the temperature of aerial cameras as constant as possible by the provision of heating devices. However, it is not feasible in practice to set cameras for a certain maximum working temperature and then, on every occasion when the camera is to be used in a lower temperature (e.g. on flights in temperate or cold regions), to condition it specially beforehand by bringing the entire camera to the working temperature. This would represent a great loss of readiness of the camera. Consequently, there is a need for a simple and reliable means for adapting the focal setting of the camera to the temperature reigning during operation.

In a camera that is equipped with a prismatic wedge for distance adjustment this need can be met in a convenient manner, according to the invention, by fitting the camera with a second prismatic wedge that can be shifted to different positions in a direction substantially parallel to the direction of shift of the first wedge and whose top is pointing in a direction opposite to that of the first wedge. By finding at different temperatures the position of the second wedge at which maximum image definition is obtained one has a means of providing complete compensation for the influence of temperature while avoiding the drawbacks involved in the use of one wedge only. These drawbacks consist in the oblique position of the focal plane with respect to the optical axis, due to the difference in thickness of the wedge from one edge of the focal plane to the other, and in the introduction of chromatic aberration by the wedge. A pair of wedges according to the invention may together act as a thin, plane-parallel plate perpendicular to the optical axis if identical wedges are used, having their surfaces parallel to each other in such a way that the wedge surfaces facing away from each other are perpendicular to the optical axis.

The invention will be further explained in the following description with reference to the drawing, in which an embodiment of the wedge arrangement according to the invention together with the means for adjusting the wedge positions are shown. It will be observed that the invention may be applied to cameras of various types largely varying in construction and operation and, accordingly, no specific camera structure is shown in the drawing.

1 is the focal plane of an aerial camera, 1a is the objective of the camera, 2 a wedge providing compensation for the influence of temperature on focal setting and 3 a wedge of similar shape situated parallel to wedge 2 for flying altitude adjustment of the camera. The two wedges are placed one behind the other at a short distance from the focal plane and are substantially parallel to the focal plane. They are mounted in windows 4 and 5 respectively which can slide independently of each other in simple parallel guides of the camera housing (not shown) so as to vary the thickness of the part of the wedges that is situated in front of the focal plane. In the embodiment shown in the drawing this sliding motion is brought about by means of two screw nuts 6 and 7 fixed to the windows 4 and 5 respectively and receiving the adjusting screws 8 and 9. Mounted on the adjusting screw 9 is a toothed wheel 11 adapted to be driven by the motor 13 via the toothed wheel 12. The motor 13 is remotely controlled by the camera operator. A remote indication of the position of wedge 3 is given by a crossed-coil instrument 16, which is fed by the potentiometer 15 whose brush arm is coupled to the driving gear of the wedge by the toothed wheel 14.

Mounted on the adjusting screw 8 is a toothed wheel 10 which engages a toothed wheel 17. The spindle 19 of this latter toothed wheel is provided with an adjusting knob 18 projecting beyond the camera housing (not shown in the drawing) and can thus be rotated by hand.

In the embodiment shown in the drawing it is assumed that temperature adjustment will comparatively seldom be required, so that remote control may be dispensed with. If desired, however, provision can of course be made for remote control or even for automatic adjustment of the temperature compensating wedge 2, under the control of a suitable temperature meter built into the camera.

Furthermore, in the figure a conventional thermostat 21 is shown which is coupled by the toothed wheel 20 to the adjusting means of wedge 2. Thermostat 21 is connected, in a conventional manner so as to control a heating device, e.g. in the form of an electric heating wire 22. In this way the temperature of the camera may be automatically brought up to the value to which the camera is adjusted by means of wedge 2 and may be kept at this value by the thermostat 21.

What I claim is:

1. A camera, particularly for aerial photography, comprising an objective, a first prismatic wedge mounted a short distance in front of the focal plane of said objective so as to be traversed by the light rays travelling between said objective and said focal plane, said first wedge being slidable in a path substantially parallel to said focal plane, first adjusting means attached to said first prismatic wedge for adjusting its position in accordance with the distance of the object to be photographed, a second prismatic wedge mounted a short distance from said first wedge in the path of the light rays and having its narrow edge pointing in a direction opposite to the narrow edge of said first wedge, said second wedge being also slidable independently of said first wedge in a path substantially parallel to said focal plane, and a second adjusting means attached to said second prismatic wedge for adjusting its position to compensate for the camera temperature, whereby the shift of said focal plane due to temperature variation may be substantially compensated.

2. A camera as claimed in claim 1 wherein said first and second prismatic wedges are identical in shape and material and have their corresponding surfaces parallel to each other, the wedge surfaces facing away from each other being perpendicular to the optical axis of said camera objective.

3. A camera as claimed in claim 1 further comprising means for electrically heating said camera and thermostat means connected to and actuated by said second prismatic wedge and connected to said heating means for controlling said heating means in response to the position of said second wedge.

References Cited in the file of this patent

UNITED STATES PATENTS

| | | |
|---|---|---|
| 1,939,172 | Jenkins | Dec. 12, 1933 |
| 2,258,903 | Mitchell | Oct. 14, 1945 |
| 2,464,139 | Luboshez | Mar. 8, 1949 |
| 2,470,455 | Avila | May 17, 1949 |
| 2,574,712 | Sachtleben | Nov. 13, 1951 |

FOREIGN PATENTS

| | | |
|---|---|---|
| 1,072,573 | France | Mar. 17, 1954 |